(12) United States Patent
Sanders et al.

(10) Patent No.: US 6,704,308 B2
(45) Date of Patent: Mar. 9, 2004

(54) APPARATUS AND METHOD FOR PROCESSING SIGNALS IN A PLURALITY OF DIGITAL SIGNAL PROCESSORS

(75) Inventors: Kirk Sanders, San Jose, CA (US); Madhu Grandhi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/163,233

(22) Filed: Sep. 29, 1998

(65) Prior Publication Data

US 2003/0135540 A1 Jul. 17, 2003

(51) Int. Cl.$^7$ ................................................ H04J 3/16
(52) U.S. Cl. ........................................ 370/376; 370/359
(58) Field of Search ................................. 370/376, 259, 370/359; 712/1, 10, 16, 28, 35; 710/1

(56) References Cited

U.S. PATENT DOCUMENTS

| | | | |
|---|---|---|---|
| 5,367,678 A | * 11/1994 | Lee et al. | |
| 5,497,373 A | * 3/1996 | Hulen et al. | |
| 5,682,484 A | 10/1997 | Lambrecht | |
| 5,740,409 A | 4/1998 | Deering | |
| 6,049,544 A | * 4/2000 | Kurdzo et al. | 370/395.1 |
| 6,237,047 B1 | * 5/2001 | Peebles et al. | 710/5 |

FOREIGN PATENT DOCUMENTS

| | | | |
|---|---|---|---|
| EP | 0 479 229 A2 | 4/1992 |
| EP | 0 505 884 A2 | 9/1992 |
| EP | 0 651 336 A1 | 5/1995 |

OTHER PUBLICATIONS

Texas Instruments, "TMS320C54X DSP Reference Set" Literature No. SPRU131F (Apr. 1999).

PCT Search Report mailed Mar. 21, 2001, from International Preliminary Examining Authority.

Pauline Markenscoff, PhD, "Bus Scheduling for a Multi–Processor System With Shared Buses", Nov. 1987, MIEEE Proceedings, Vol 134 Pt.E. No. 6, pp. 288–294.

PCT Search Report mailed Mar. 21, 2001, from the International Preliminary Examining Authority.

Pauline Markenscoff, PhD, "Bus Scheduling for a Multiple–Processor System With Shared buses" Nov. 1987, MIEEE Proceedings, vol. 134 Pt.E. No. 6, pp. 288–294.

* cited by examiner

*Primary Examiner*—Kenneth Vanderpuye
(74) *Attorney, Agent, or Firm*—Blakely, Sokoloff, Taylor & Zafman LLP (57) ABSTRACT

An apparatus and method for data processing in a flexible multiple-DSP architecture that can be readily adapted to changing customer demands and changes in DSP processing capability is described. The apparatus comprises of two or more processors, two or more dedicated serial data buses, and a shared data bus. Each processor processes data received via the dedicated data bus in a first type of processing task. Each processor processes data received via the shared data bus in a second type of processing task.

10 Claims, 8 Drawing Sheets

APPARATUS AND METHOD FOR PROCESSING SIGNALS IN A PLURALITY OF DIGITAL SIGNAL PROCESSORS

FIELD OF THE INVENTION

The present invention relates to the field of data processing, and more particularly to processing signals in a multiple-processor architecture.

BACKGROUND OF THE INVENTION

Digital signal processors (DSPs) are commonly used in networking equipment to process digitized voice signals. Often, multiple DSPs are arranged in a particular architecture that is selected to meet the needs of a given voice processing application. The exact architecture used is typically influenced by a number of different factors.

One factor that influences a multiple-DSP architecture is the DSPs' processing power, often represented by a metric called "MIPS" (millions of instructions per second). The processing power, or MIPS, of a DSP is determined by a number of factors, including the data width of the DSP, the clock speed of the DSP, the parallel capability of the DSP and so forth. Generally, the greater the processing power of the DSPs in a given architecture, the fewer the number of DSPs need be assigned to a given task.

Another factor that influences a multiple-DSP architecture is the data transfer mechanism in the architecture. For example, in voice processing applications, data is often delivered via a number of time-division-multiplexed (TDM) buses, with individual units of voice data (e.g., voice samples) being transmitted in respective time-slots on one or more of the TDM buses. A multiple-DSP architecture may vary significantly depending on the extent to which TDM buses or other data transfer mechanisms can deliver the data needed for signal processing applications.

A third factor that influences a multiple-DSP architecture is the nature of the signal processing to be performed by the architecture. This factor is closely related to both the data transfer capability of the architecture and to the processing power of the DSPs used in the architecture. For example, a voice compression processing task often requires a relatively larger number of instructions to be executed per data value than does an echo cancellation processing task. Thus, for a given level of data flow on a TDM bus, complex processing tasks usually require greater processing power than do simple processing tasks.

One prior art architecture that is common in voice processing applications involves assigning particular types of processing tasks to specific DSPs in the architecture and coupling the DSPs to either shared TDM buses or dedicated TDM-buses accordingly. For example, DSPs assigned to perform echo cancellation are coupled to respective dedicated TDM buses while DSPs assigned to perform voice compression are coupled to a shared TDM bus. A significant drawback of this approach, however, is that the architecture constrains the types of processing tasks the DSPs can perform, making it difficult to reapply the architecture in the face of changing customer demands or advances in DSP processing capability.

SUMMARY OF THE INVENTION

An apparatus and method for data processing in a flexible multiple-DSP architecture that can be readily adapted to changing customer demands and changes in DSP processing capability is described. The apparatus comprises of two or more processors, two or more dedicated serial data buses, and a shared data bus. Each processor processes data received via the dedicated data bus in a first type of processing task. Each processor processes data received via the shared data bus in a second type of processing task.

Other features and advantages of the invention will be apparent from the accompanying drawings and from the detailed description that follows below.

DESCRIPTION OF THE DRAWINGS

The present invention is illustrated by way of example and not limitation in the figures of the accompanying drawings in which like references indicate similar elements and in which.

DETAILED DESCRIPTION

An apparatus and method for data processing using a flexible multiple-DSP architecture that can be readily adapted to changing customer demands and changes in DSP processing capability is described. Unlike many prior art multiple-DSP architectures in which DSPs can achieve full or near full processing potential for only a single type of processing task, the flexible multiple-DSP architecture allows the DSPs therein to achieve full or nearly full processing potential in more than one type of processing task. Additionally, the flexible multiple-DSP architecture allows the DSPs therein to dynamically switch from one mode of operation to another without re-programming.

Figure 1:
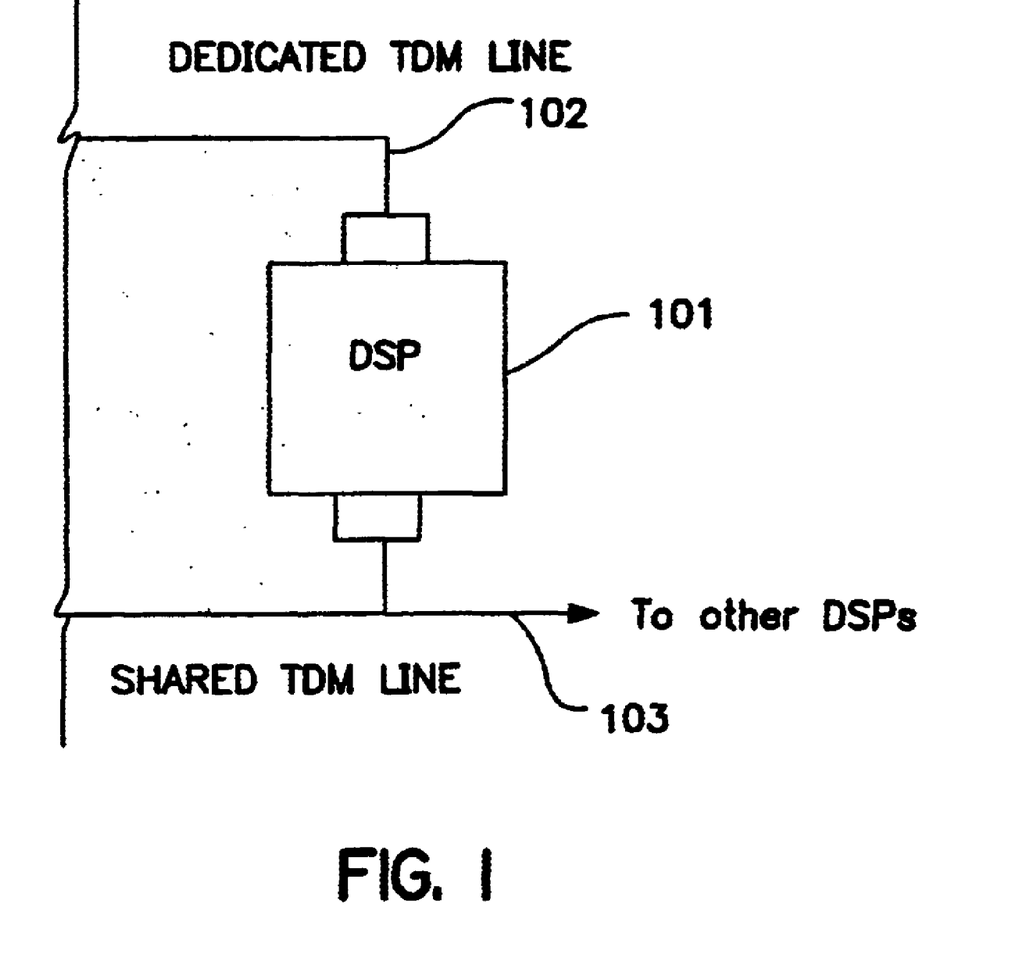
FIG. 1 depicts a flexible DSP architecture according to one embodiment.

FIG. 1 depicts one embodiment of a flexible multiple-DSP architecture. The DSP 101 can perform more than one type of processing task at or near full processing capacity without the need to rearrange existing data buses and without requiring additional data buses because DSP 101 is coupled to both a dedicated TDM bus 102 and a shared TDM bus 103. Data busses 102 and 103 are usually each embodied in the form of a pair of wires, one wire transmitting data to DSP 101 and the other wire transmitting data from DSP 101.

For example, some types of processing tasks, such as echo cancellation, require a DSP to have access to the full bandwidth or nearly the full bandwidth of a data bus (e.g., all 128 channels of an 8.192 mega-bits per second TDM bus) to process data at or near the DSP's full processing capacity. When canceling line echo, the DSP 101 samples data from the dedicated TDM bus 102. The DSP 101 thus has access to all 128 channels available in the TDM bus and consequently can process data (i.e., cancel line echo) at or near the DSP's full processing capacity. By contrast, other types of processing tasks, such as data compression, may not require a DSP to have access to the full bandwidth of a data bus to process data at or near the DSP's full processing capacity. Thus, when compressing data, the DSP 101 samples a portion of the data available on the shared TDM bus 103, as well as from the dedicated TDM bus 102.

The flexible multiple-DSP architecture shown is also cost effective. Because a DSP usually requires only a fraction of the 128 channels available in a TDM bus to make full use of its data-compression capability, the DSP can share the TDM bus with other DSPs so that every channel of the bus is used. Often, it is desirable to use every channel of a TDM bus because such practice tends to reduce the number of TDM buses and associated circuitry in (and hence the cost of) a multiple-DSP architecture.

Although voice processing applications are primarily described herein, a multiple-DSP architecture according to embodiments described herein may be employed in many different data processing applications, such as processing routing data, to achieve a cost-effective and flexible architecture that may be readily adapted to changing customer demands.

Figure 2:
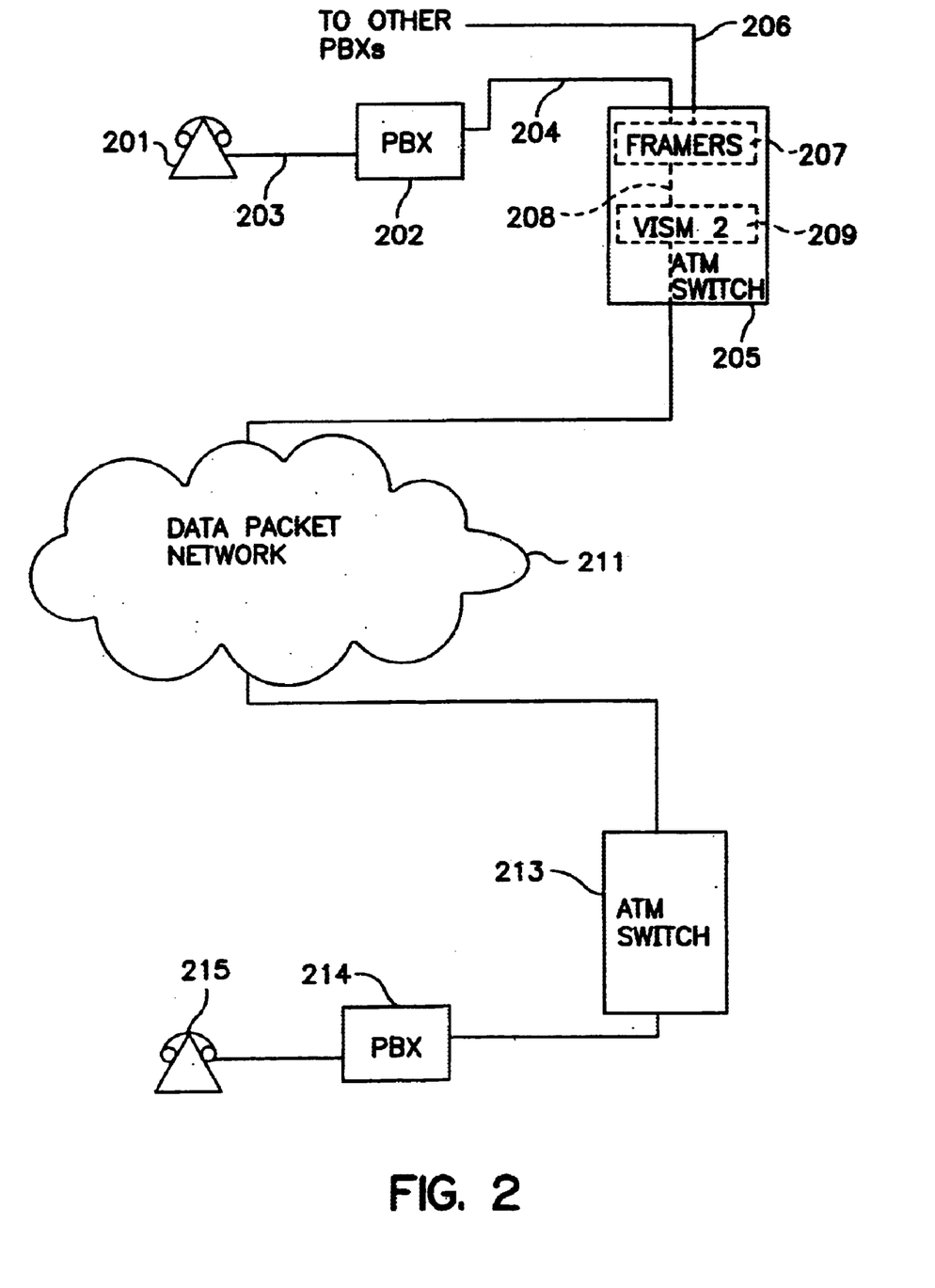
FIG. 2 depicts an embodiment of a data network comprising a voice processing device that includes a flexible multiple-DSP architecture.

FIG. 2 is a block diagram of a data transfer system in which one or more embodiments of the flexible multiple-DSP architecture may be used. A telephone 201 converts sounds such as the human voice to an electrical analog signal. This signal is often transmitted to a Private Branch Exchange (PBX) 202 via a telephone line 203. The PBX 202 digitizes the analog voice signal and conveys this digital signal via a data line 204 (e.g., an E1 or T1 trunk line) to an asynchronous transfer mode (ATM) switch 205 (a Frame Relay switch or other network switch may also be used). In addition to the aforementioned data line from the PBX, the ATM switch may also receive other data lines 206 from other PBXs. A framer 207 in the ATM switch 205 combines the signals of the multiple T1/E1 lines into a single data line usually by time-division multiplexing (TDM). The resulting TDM line 208 is then transmitted to a Voice Interface Service Module (VISM) 209 in the ATM switch 205. The VISM 209 performs processing tasks that include line-echo cancellation and data compression. Then, the ATM switch 205 breaks the data into packets in preparation for transfer over a data-packet network 211 (such as an Asynchronous Transfer Mode (ATM) or Frame Relay or other packet-switching Network). The ATM switch 205 transmits the data over the network 211 to a receiving ATM switch 213.

On the receiving end, the ATM switch 213 combines and de-compresses the data packets into a digital data signal which is then sent to a second PBX 214. The PBX 214 converts the digital signal to an analog signal and sends this signal to a receiving telephone 215. The telephone converts the analog signal to sound.

Figure 3:
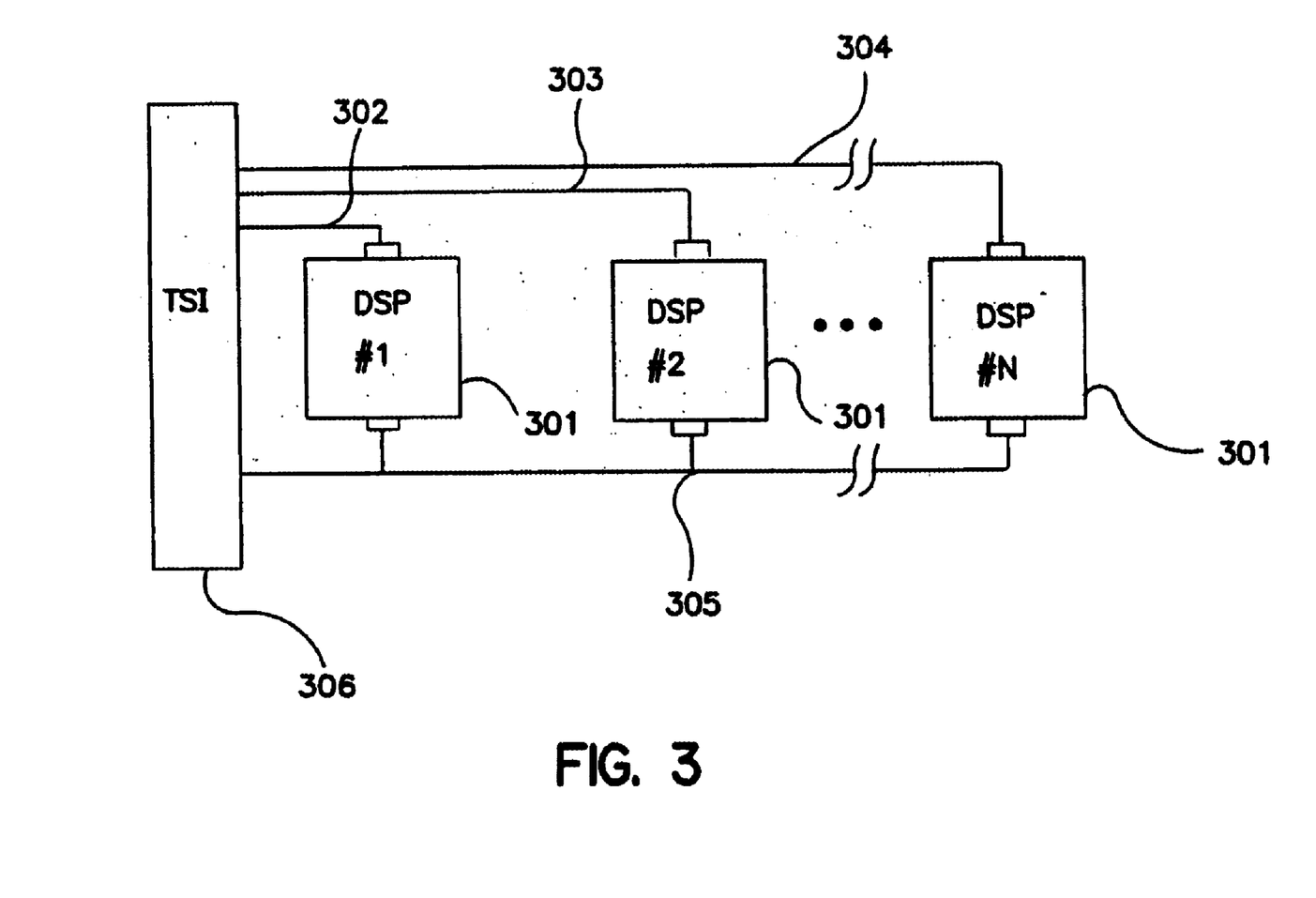
FIG. 3 depicts an embodiment of a flexible multiple-DSP architecture that allows two different types of tasks to be executed at or near the processing capacity of the DSPs.

FIG. 3 is a block diagram of a flexible multiple-DSP architecture according to an embodiment (used in the VISM) that allows the DSPs therein to perform two types of processing tasks (e.g., line-echo cancellation and data compression) at or near processing capacity. In one embodiment, the VISM includes a group of two or more DSPs 301, TDM buses 302–305, and a time-slot interchanger (TSI) 306. TDM buses 302–305 each include of a pair of wires, one wire transmitting data to the DSP, the other wire transmitting data from the DSP.

Each DSP 301 has two modes of operation. In the first mode, the DSP samples data from a dedicated TDM bus and performs a first type of data processing task, such as line-echo cancellation. In the second mode, the DSP samples data from a shared TDM bus and then performs a second type of data processing task, such as data compression. The operating mode of the DSPs may be readily changed by re-programming the DSPs.

Each TDM bus has 128 time slots per frame and hence can usually carry 128 octets (eight-bit units of information), given a data flow rate of 8.192 mega-bits per second and a sampling rate of 8 KHz. Each octet is commonly referred to as a channel. Each octet is also commonly referred to as a Digital Signal Level Zero or DS0 (e.g., the subject TDM line can carry 128 DS0s or channels). For a given frame, a DSP can sample DS0s from any time slot of the frame and thus can process any or all signals on a TDM bus.

The TSI 306 is used to forward data onto a selected TDM bus. For example, in one embodiment the TSI 306 is capable of forwarding a DS0 from any time slot in any TDM bus connected to the TSI 306 to any time slot in any other TDM bus connected to the TSI 306.

According to one embodiment, a flexibility is achieved by arranging the DSPs, the TDM buses and the TSI in a particular architecture. Each DSP of the group is coupled to a respective dedicated TDM bus and a common shared TDM bus. For example, DSP number 1 is coupled to a dedicated TDM bus 302 and a shared TDM bus 305. DSP number two is coupled to another dedicated TDM bus 303 and the shared TDM bus 305.

The above architecture, consequently, will allow the DSPs to either cancel line echo or to perform data compression. For example, when data compression is needed, TSI 306 routes data to be compressed to the shared TDM bus 305 as well as to the dedicated TDM buses. Each DSP 301 connected to the shared TDM bus 305 (and programmed to compress data) would then sample a fraction of the DS0s (e.g., 32 of 128 DS0s) from the shared TDM bus 305 (as well as from the dedicated TDM bus), and compress the data. The compressed data is sent back to the TSI 306 via both the shared TDM bus 305 and the dedicated TDM bus.

To adapt the DSPs to cancel line echo one, a few, or all of the DSPs may be re-programmed to sample data from its dedicated TDM bus instead of from the shared TDM bus 305 and to cancel line echo instead of compressing data. To cancel line echo, the TSI 306 routes data to the dedicated TDM buses 302, 303, and 304. Each DSP 301 would then sample a fraction of the DS0s needing echo cancellation (e.g., 48 out of 128 DS0s) from its respective dedicated TDM line and cancel line echo from this data. The echo-processed data is sent back to the TSI 306 via the respective dedicated TDM buses 302, 303, and 304.

Because the DSPs in the flexible multiple-DSP architecture may perform either echo cancellation or data compression, the same VISM is readily adaptable and may be used to meet different customer demands. For example, for a customer who needs only data compression, the VISM can often be easily adapted to meet this need simply by re-programming the DSPs. Usually, no additional TDM buses nor re-arrangement of the existing TDM buses on the VISM are required. In an alternate embodiment, discussed below, DSPs may be dynamically reallocated to perform different types of processing tasks.

Furthermore, because each DSP has both a dedicated and a shared TDM bus, the DSPs in the flexible multiple-DSP architecture can usually achieve their full or nearly full processing capacity while performing either task. For example, a DSP usually requires one additional DS0 (for reference) to cancel line echo from a single DS0. Consequently, in an echo cancellation task, a DSP is often limited more by the amount of DS0s available to it than by its processing power and, hence, usually requires access to a large fraction of the 128 channels of a TDM bus. In contrast, a DSP does not need additional DS0s to compress a single DS0 and, hence, requires only a relatively small fraction of the 128 channels of a TDM bus. Consequently, in a data compression task, a DSP is often limited more by its processing power than by the number of available DS0s and, hence, can usually share a TDM bus so that every channel of each TDM bus is used.

Often, it is beneficial to use every channel of a TDM bus because such practice reduces the number of TDM buses and associated circuitry needed in (and hence the cost of) a multiple-DSP architecture. For example, an architecture that uses only 64 channels in each of its TDM buses will require at least twice as many TDM buses as an architecture that uses all 128 channels of each of its TDM buses.

Additionally, the ability to achieve each DSP's full or nearly full processing capacity (in either data compression or echo cancellation) often allows the VISM to use fewer DSPs. For example, a VISM architecture that achieves a 50 percent DSP processing utilization will need fewer DSPs than an architecture that achieves a 20 percent DSP processing utilization. By reducing the number of required DSPs, cost and complexity are reduced.

Finally, the flexible multiple-DSP architecture may be readily adapted to benefit from advances in DSP processing capability. For example, if DSPs were able to cancel line echo for 48 DS0s instead of 24 DS0s, the DSP would need a total of 96 instead of the 48 DS0s for reference and cancellation. In the flexible multiple-DSP architecture, because the DSP is connected to a dedicated TDM bus and hence has (in one embodiment) 128 available DS0s, there is room to accommodate and hence benefit from the increase in DSP processing power. Furthermore, this upgrade in processing power would free up some of the DSPs (that would normally be needed for echo cancellation) for data compression. Because upgrades in processing power often do not entail a change in the external characteristics of the DSP, such an upgrade can be performed without redesigning the printed circuit board. Thus, the flexible multiple DSP architecture may readily benefit from upgrades in DSP processing power.

Although the exemplary types of processing tasks discussed above include echo cancellation and voice compression, the flexible multiple-DSP architecture is more generally suited to process either a program that requires many MIPS per DS0 (and, therefore, that can process only a relatively small number of DS0s) or a program that requires few MIPS per DS0 (and, therefore, that can process a relatively large number of DS0s). Generally, any type of processing task may be processed by embodiments of the flexible multiple DSP architecture disclosed herein without departing from the spirit and scope of the present invention.

Figure 4:
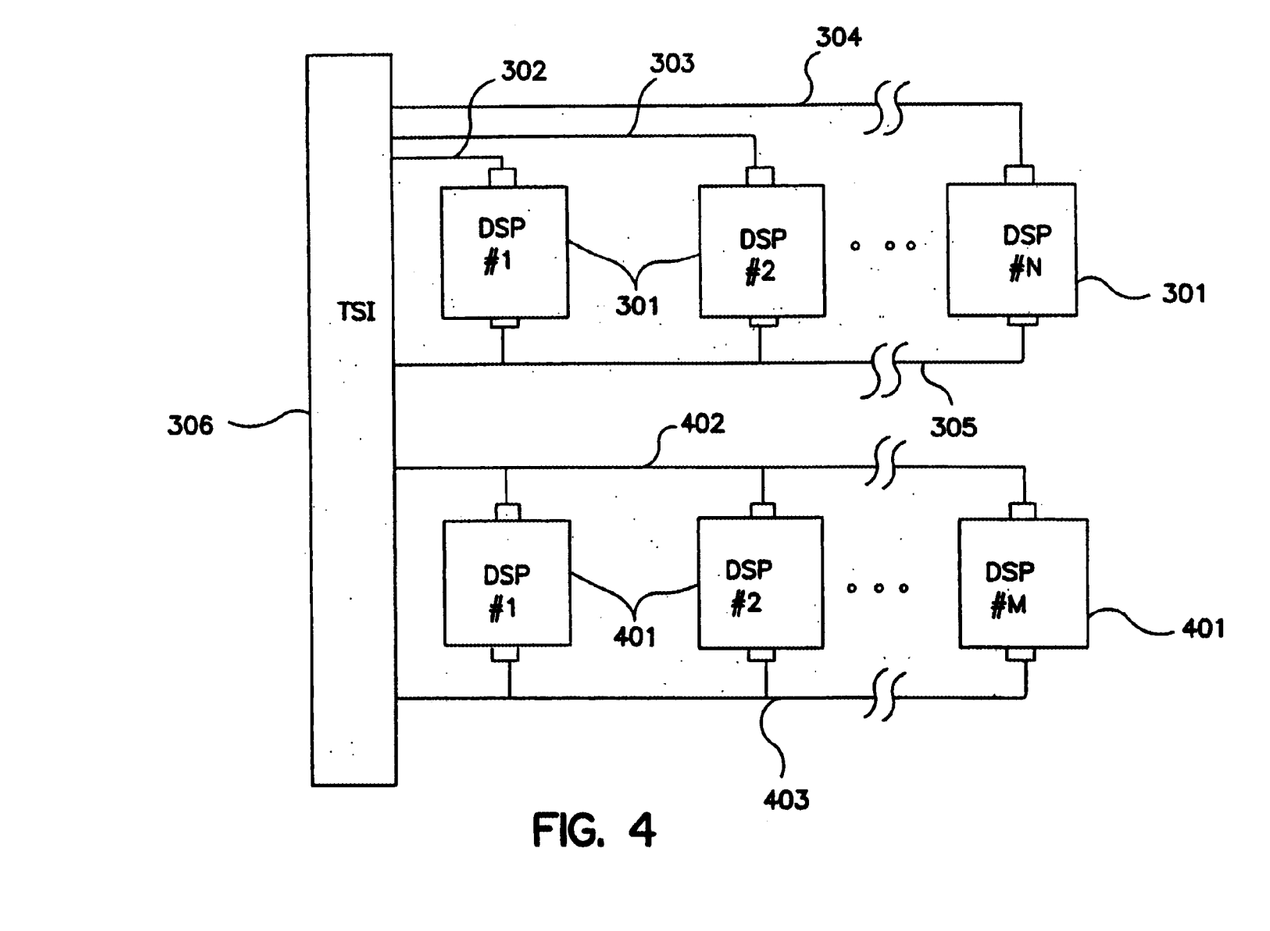
FIG. 4 depicts an embodiment of a multiple-DSP architecture that includes a first set of DSPs coupled to respective dedicated buses and to a shared bus, and a second set of DSPs coupled to a plurality of shared buses.

FIG. 4 depicts an embodiment of a multiple-DSP architecture that is used in the VISM and that includes a first set of DSPs 301 coupled to respective dedicated buses 302, 303, 304 and to a shared bus 305, and a second set of DSPs coupled to a plurality of shared buses 402, 403. The multiple-DSP architecture of FIG. 4 includes the same components as those shown in FIG. 3, including DSPs 301 that can each execute either a data compression task or an echo cancellation task. In addition, the multiple-DSP architecture of FIG. 4 includes a group of two or more DSPs 401 arranged for data compression. Each DSP 401 in this second group is connected to two shared TDM buses 402 and 403. Furthermore, each DSP 401 in this second group is programmed to sample from both shared TDM buses 402 and 403 to compress data. Consequently, this embodiment of the flexible multiple-DSP architecture allows the VISM not only to either cancel line echo or compress data but also to perform both tasks without re-programming the DSPs. For example, the VISM can often use the first group of DSPs 301 to cancel line echo and the second group of DSPs 401 to compress data.

To cancel line echo, the TSI 306 routes data to the dedicated TDM buses 302 through 304. The DSPs 301 connected thereto then sample the data, cancel line echo in the data, and sends the processed data back to the TSI 306 via the respective dedicated TDM buses 302–304. To compress data, the TSI routes data to both of the shared TDM buses 402 and 403. Each DSP 401 then samples from both shared TDM buses, compresses the data, and sends the data back to the TSI 306.

In the embodiment of the flexible multiple-DSP architecture depicted in FIG. 4, the VISM has the advantages of the embodiment shown in FIG. 3 and, because there are two groups of DSPs, the VISM has the added benefit of being able to cancel line echo and compress data without re-programming the DSPs. Note that this advantage may be achieved by connecting dedicated TDM buses to the second group of DSPs 401 in the same arrangement as the first group of DSPs 301. However, this arrangement, though possible, requires more TDM buses than the arrangement depicted by FIG. 4.

Figure 5:
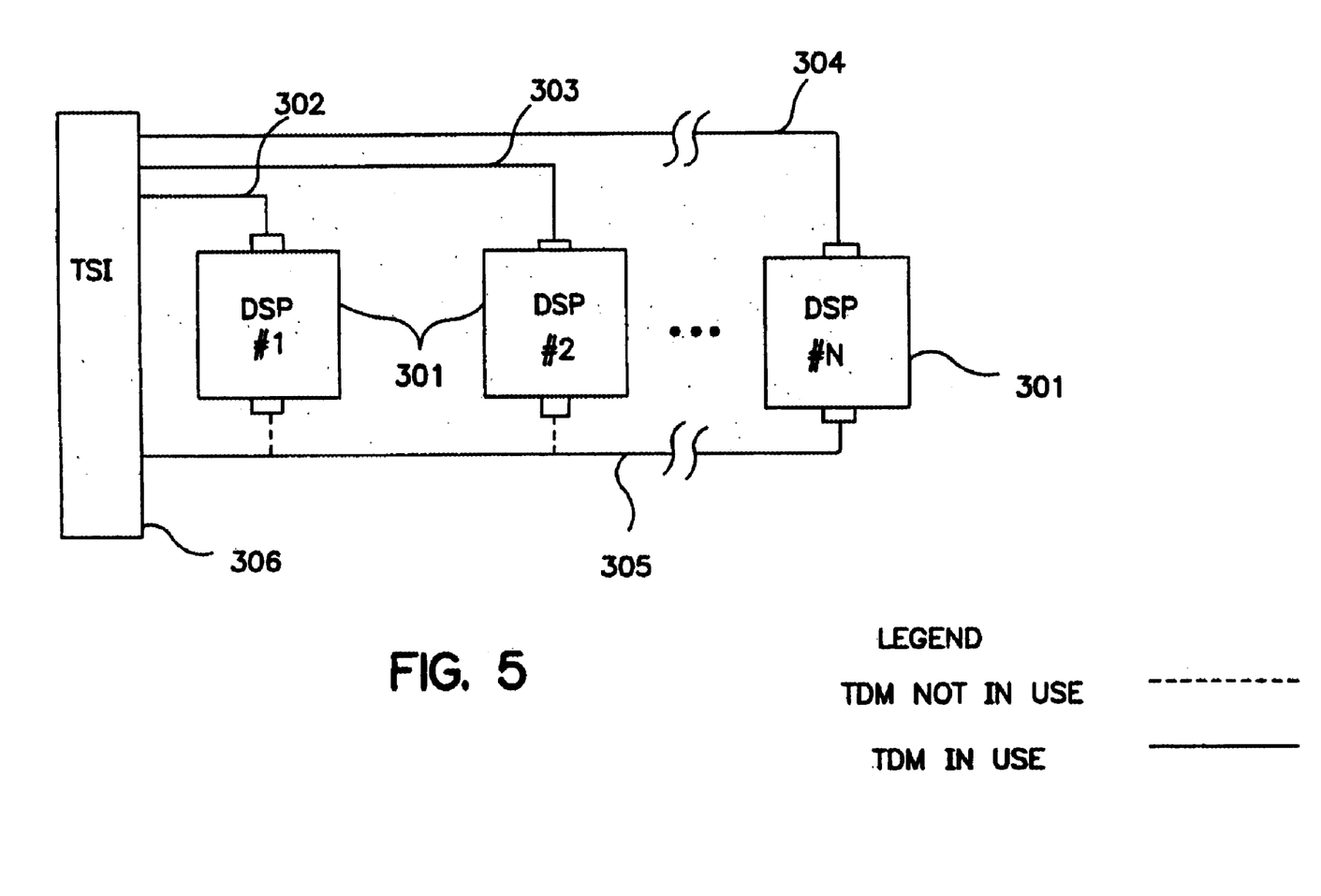
FIG. 5 illustrates an exemplary use of the time-division multiplexed buses in the flexible multiple-DSP architecture of FIG. 3.

FIG. 5 illustrates an exemplary use of the time-division multiplexed buses in the flexible multiple-DSP architecture of FIG. 3. One DSP in the group of DSPs 301 is programmed to use the shared TDM bus 305 as a dedicated TDM bus when the other DSPs are not sampling from the shared TDM bus 305. For example, if N equals 3, then when DSPs numbers 1 and 2 are sampling data only from dedicated TDM buses 302 and 303, respectively, to cancel line echo, DSP number 3 can use the shared TDM bus 305 as a dedicated TDM bus. Consequently, DSP number 3 would have access to 256 channels (or 128 channels per data port) via TDM buses 304 and 305. This capability is advantageous because there are processing tasks which could require that a DSP have access to 256 DS0s, (8 E1 trunks worth of data). An example of this is Channel Associated Signalling (CAS) processing.

Figure 6:
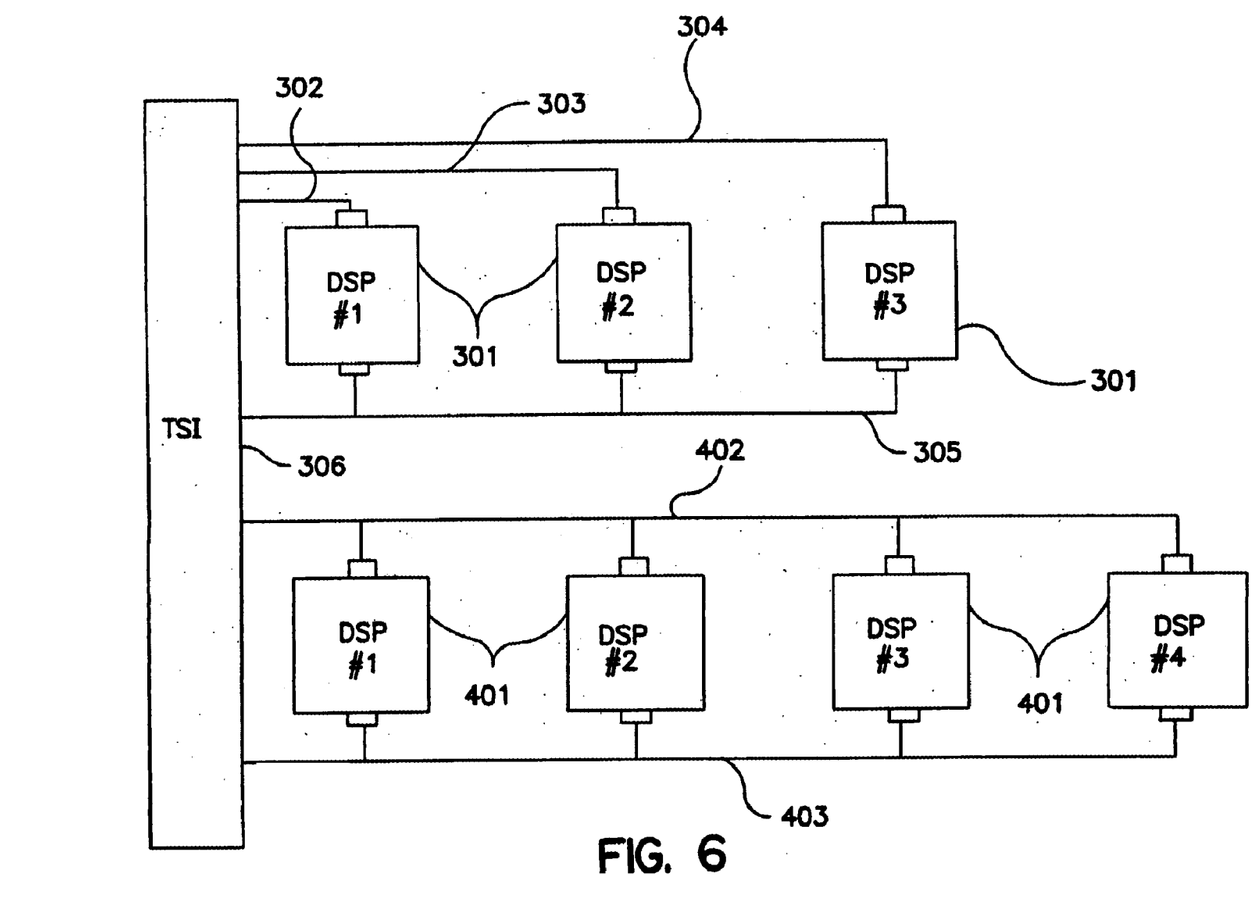
FIG. 6 depicts an embodiment of the multiple-DSP architecture of FIG. 4 in which there are three DSPs in the first set of DSPs and four DSPs in the second set of DSPs.

FIG. 6 depicts an embodiment of the multiple-DSP architecture of FIG. 4 in which N equals three and M equals four. As with the DSPs 301 shown in FIG. 3, the first plurality of DSPs 301 are capable of either compressing data or canceling line echo. As with the DSPs 401 shown in FIG. 4, the second plurality of DSPs 401 (designated to compresses data) supplement the data compression capability of the first plurality of DSPs 301. Furthermore, the second plurality of DSPs allows the VISM to both cancel line echo and compress data without re-programming the DSPs.

As described above in reference to FIG. 5, at least one of the first plurality of DSPs 301 could be programmed to use the shared TDM bus 305 as a dedicated TDM bus when the other two DSPs connected to the shared TDM bus 305 are not sampling data from the shared TDM bus 305.

The embodiment of the flexible multiple-DSP architecture shown in FIG. 6 is particularly advantageous in view of a number of competing considerations. One consideration, for example, is the number of DSPs required to compress data from a single TDM bus. Often, the optimal number of DSPs needed per TDM bus is the number of DS0s that a TDM bus can carry (e.g., 128 for an 8.192 mega-bit per second bus) divided by the maximum number of DS0s a single DSP can compress (often 32), which in the current embodiment, is four (128/32). This ensures that each DSP will always have a sufficient number of DS0s available to achieve full or nearly full processing utilization. It also reduces the likelihood of "wasting" unused DS0s, thereby under-utilizing the TDM bus.

Another consideration is the number of DSPs required to cancel line echo per TDM bus. As previously discussed, a single DSP should be coupled to a dedicated TDM line to cancel line echo in order to achieve the full or near full processing utilization of the DSP.

Another consideration is the maximum number of TDM buses a TSI can service. Often, an increase in the number of TSIs can add to the complexity and cost of a multiple-DSP architecture. Generally, it is desirable to keep the number of TSIs, and hence the number of TDM buses, to a minimum.

Another consideration is efficient DSP use. As previously discussed, it is often desirable to fully use the processing capacity of each DSP because this practice reduces the number of DSPs required for a given processing demand.

Yet another consideration is the total processing load for the VISM (often eight E1 line's worth of data or 240 DS0s). The total processing load usually determines the number of DSPs that are required to be coupled to both a dedicated TDM bus and a shared TDM bus. Often, this number of DSPs is the ratio of the processing load (e.g., eight E1 line's worth of data or 240 DS0s) and the maximum number of DS0s a DSP can cancel line echo from (e.g., 24), which in the current embodiment is ten (240/24). Twelve DSPs are used in this case to allow for some margin in design. Having groups of three DSPs in the flexible arrangement (using both a dedicated TDM bus and a shared TDM bus) allows the 12 DSPs to be evenly divided into two sets, with each set requiring one TSI. Having groups of four of the remaining DSPs on the VISM in the shared-bus-only arrangement limits the number of TSIs to three. Consequently, the resulting VISM achieves flexibility at a reasonably low cost by limiting the number of TDM buses and making use of the full or near full processing capacity of its DSPs.

Another consideration is the reuse of compression programming. When DSPs 301 are used for data compression, data is transmitted on both shared TDM bus 305 and dedicated TDM buses 302–304. This allows the same data compression programming that is used in DSPs 401 to also be used in DSPs 301. This simplifies code development and modification.

Figure 7:
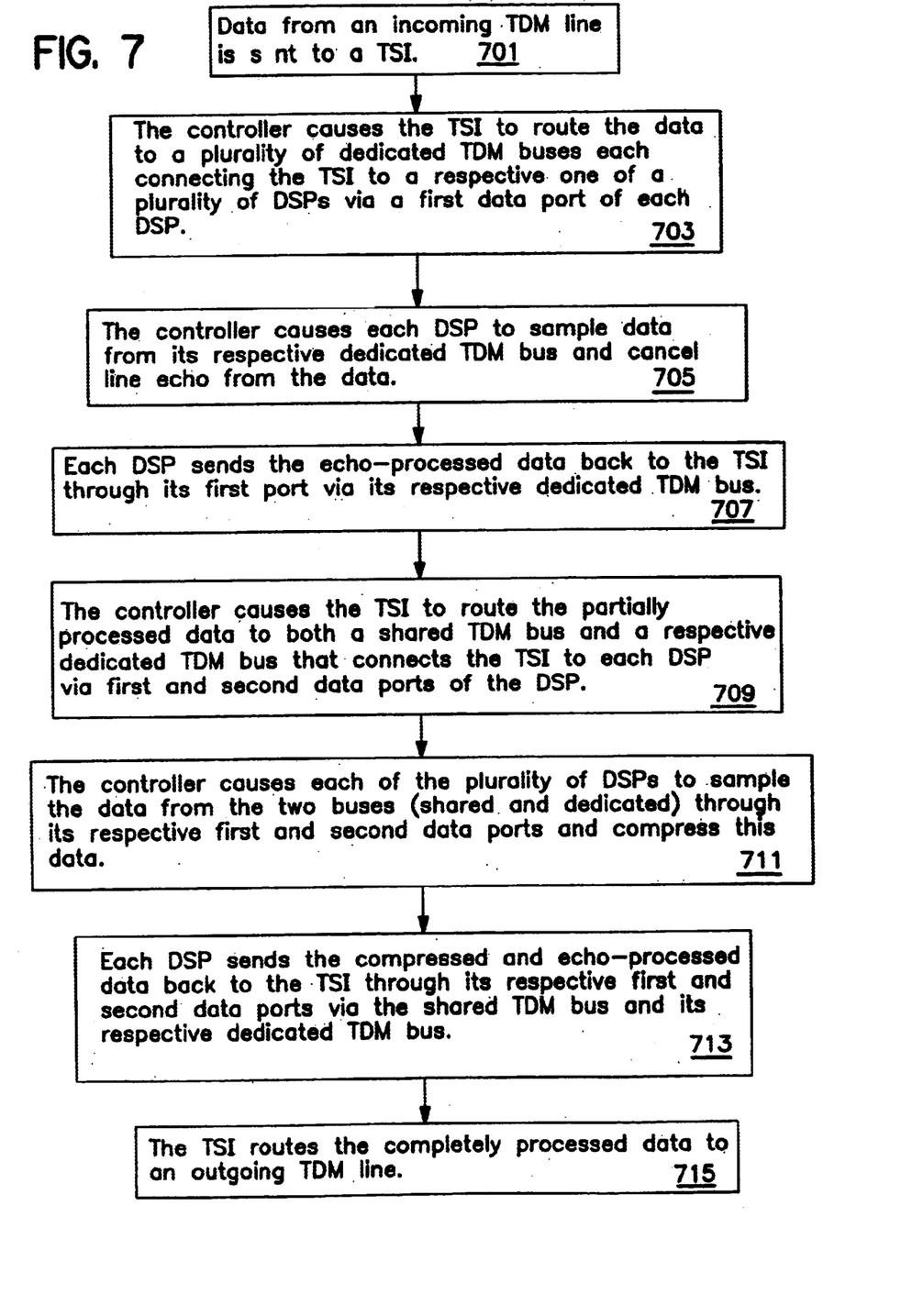
FIG. 7 is a flow diagram of a method for utilizing a flexible multiple-DSP architecture according to one embodiment.

FIG. 7 is a flow chart of another embodiment of the present invention. Digitized voice data requiring echo cancellation and compression is sent to a TSI via an incoming TDM buses in block 701. A controller (e.g., a microprocessor, microcontroller, or another DSP) sends control signals to the TSI and to a plurality of DSPs. In response, the TSI routes the data to a plurality of dedicated TDM buses, each coupled to a respective one of the plurality of DSPs in block 703. In block 705, each DSP samples data from its respective dedicated TDM bus and performs a first type of processing task such as line-echo cancellation. In block 707, each DSP transmits the echo-processed data back to the TSI via the DSP's respective dedicated TDM bus.

The TSI then routes the echo-processed data to a shared TDM bus, as well as to another dedicated TDM bus in block 709. In block 711, each DSP samples data from the shared TDM bus (as well as the dedicated TDM bus) and performs a second type of processing task such as data compression. In block 713, each DSP transmits the compressed and echo-processed data back to the TSI via the two TDM buses (shared and dedicated). The controller TSI then routes the echo-processed and compressed data to an outgoing TDM line in block 715. Alternatively, the data compression DSP could route the echo-processed and compressed data directly to the controller via a different, non-TDM medium.

For digitized voice data that does not require echo cancellation, the TSI routes the data directly to the data compression DSPs via the shared and dedicated TDM buses, bypassing the echo canceller DSPs. Similarly, for digitized voice data not requiring compression, the TSI bypasses the data compression DSPs. Although echo cancellation and data compression are discussed, the method described above allows DSPs to perform any two data processing tasks (e.g., encryption, noise reduction, filtering, etc.).

Figure 8:
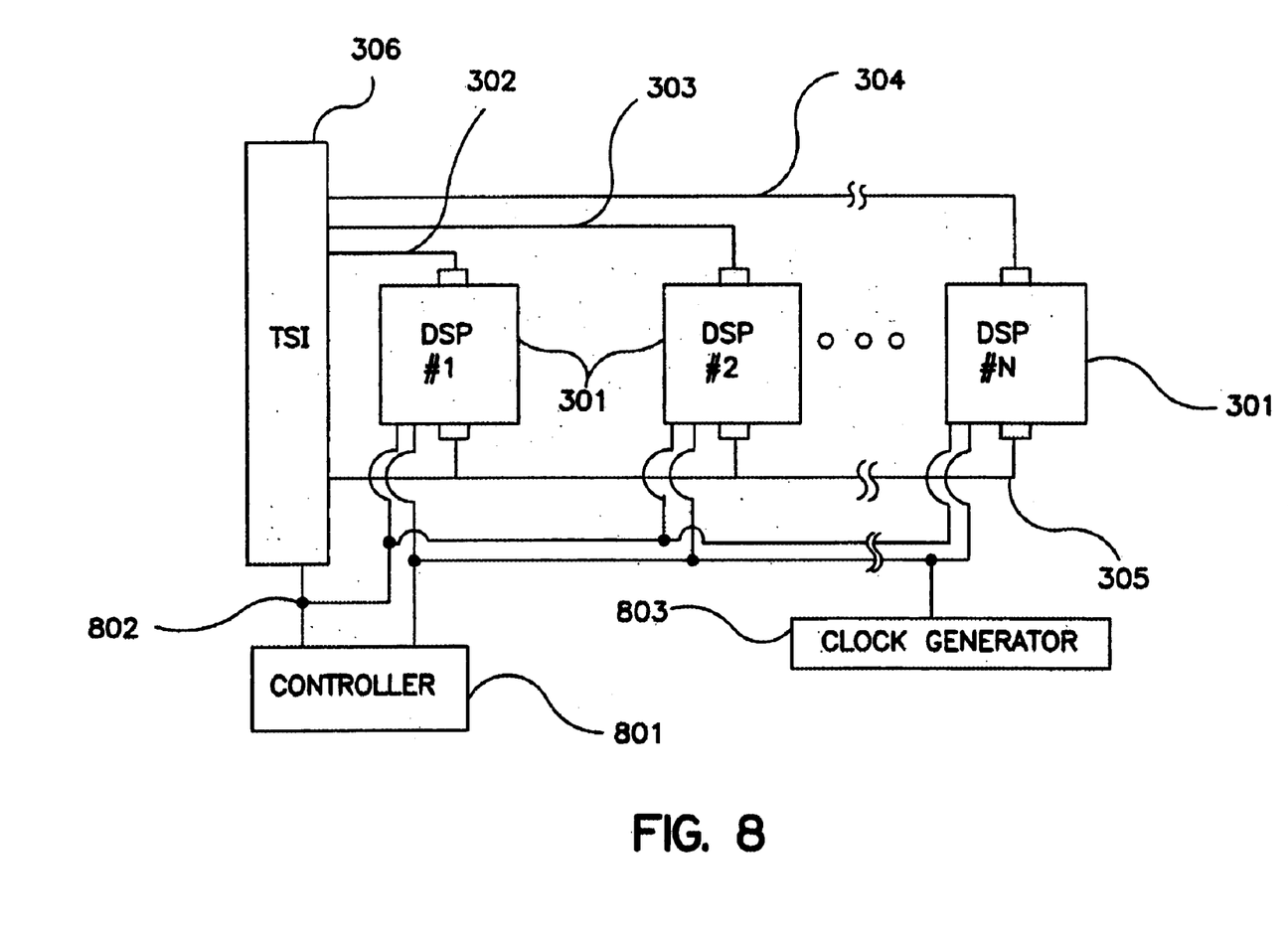
FIG. 8 depicts an embodiment of a flexible multiple-DSP architecture that includes a controller and a clock generator.

FIG. 8 is a block diagram of an embodiment of a flexible multiple-DSP architecture that includes a controller 801 and a clock generator 803. In this embodiment, the same components of FIG. 3 are used (i.e., components 301 through 306 are the same as those in FIG. 3). Additionally, each DSP in this embodiment includes firmware that allows the DSPs to dynamically switch from an echo cancellation to a data compression processing task. Each DSP is programmed to sample from its respective dedicated TDM bus for data requiring processing through a simple algorithm that is capable of processing many DS0s (such as echo cancellation) and from the shared TDM bus (as well as the dedicated TDM bus) for data requiring processing through a complex algorithm that is not capable of processing many DS0s (such as data compression). Furthermore, a controller 801 (a microprocessor) controls the TSI and the DSPs via control signal lines 802 connecting the output of the controller to the TSI and each DSP. A clock generator 803 provides a clock signal to the controller, the TSI, and each DSP.

For example, to cancel line echo, the controller sends a signal to the TSI causing the TSI to route data requiring echo cancellation to the plurality of dedicated TDM buses. The controller also sends a signal to each DSP connected to the dedicated TDM buses causing the DSPs to sample data therefrom and cancel line echo from this data. To compress data, the controller sends a signal to the TSI causing the TSI to route data requiring compression to the shared TDM bus as well as the dedicated TDM buses. The controller also sends a signal to each DSP connected to the two TDM buses, shared and dedicated, causing the DSPs to sample data therefrom and compress this data.

Because the DSPs in the flexible multiple-DSP architecture can dynamically switch from one type of processing task to another, these DSPs are not idle as often as the DSPs in prior art architectures. For example, in a prior art DSP architecture in which DSPs are limited to performing specific types of tasks because of their architectural arrangement, DSPs designated for echo cancellation would usually be idle during periods when echo cancellation is not needed. On the other hand, in the flexible multiple-DSP architecture, the DSPs are always processing data because they can efficiently perform either echo cancellation or data compression.

Furthermore, because the same DSPs may be used for both echo cancellation and data compression in the flexible multiple-DSP architecture, fewer DSPs are required as compared to single-purpose DSPs applied to the same processing load. For example, for a common processing load of 64 DS0s requiring echo cancellation and LD-CELP compression, this would require 3 echo cancellers (64/24) and 32 data compressors (64/2). For a common processing load of 240 DS0s requiring echo cancellation and $\mu$-law pule-code modulation compression, this would require 10 echo cancellers (240/24) and 15 data compressors (240/16). The flexible multiple-DSP architectures could achieve either of these two load examples with a minimum of 35 DSPs. A fixed-task-assignment DSP architecture, however, would require 42 (10+32) DSPs to achieve either of these two load examples.

Finally, the flexible multiple-DSP architecture may be readily adapted to changes in DSP processing capability. For example, if a DSPs becomes available that can cancel line echo for 48 DS0s instead of 24 DS0s, the DSP would need additional DS0s for reference (e.g., 96 total DS0s instead of the 48 total DS0s). In the flexible multiple-DSP architecture described herein, because the DSP is connected to a dedicated TDM bus and hence has 128 available DS0s, there is room to accommodate and therefore benefit from the increase in DSP processing power. Furthermore, this upgrade in processing power would free up some of the DSPs (that would normally be needed for echo cancellation) for data compression. Thus, the flexible DSP architecture described herein may readily take advantage of upgrades in DSP processing power without requiring a redesign of the printed circuit board.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. An apparatus comprising:

a plurality of processors;

a plurality of dedicated data buses each coupled to a respective one of the plurality of processors;

a first shared data bus coupled to each of the plurality of processors, the plurality of processors capable of processing data received via the plurality of dedicated data buses to prepare for transmission in a first type of processing task and subsequently processing data received via the first shared bus in a second type of processing task;

a second plurality of processors;

a second shared data bus coupled to each of the second plurality of processors;

a third shared data bus coupled to each of the second plurality of processors, the second plurality of processors processing data received via the second shared data bus and the third shared data bus in the second type of processing task;

a time-slot interchanger to route data to specified data buses; and, a controller, coupled to the time-slot interchanger, to direct the routing of data pertaining to the first type of processing task to the plurality of dedicated data buses, direct the plurality of processors to obtain data from the plurality of dedicated data buses and process the data in accordance with the first processing task, and subsequently, dynamically switch from the first type of processing task to the second type of processing task by directing the routing of data pertaining to the second type of processing task to the shared data buses, and directing the plurality of processors to obtain data from the shared data buses and process the data in accordance with the second processing task.

2. The apparatus of claim 1 wherein there are three processors in the plurality of processors, three dedicated data buses in the plurality of dedicated data buses, and four processors in the second plurality of processors.

3. The apparatus of claim 1 wherein at least one processor in the plurality of processors is configured to use the first shared data bus as a dedicated data bus when other processors in the plurality of processors are not sampling data from the first shared data bus.

4. The apparatus of claim 1 wherein the processors are digital signal processors.

5. The apparatus of claim 1 wherein the first processing task includes line echo cancellation.

6. The apparatus of claim 1 wherein the second processing task includes data compression.

7. The apparatus of claim 1 wherein at least a first processor of the plurality of processors performs the first processing task while in a first mode of operation and performs the second processing task while in a second mode of operation.

8. The apparatus of claim 7 wherein the first processor is switched between the first mode of operation and the second mode of operation in response to being reprogrammed.

9. The apparatus of claim 1 wherein the data buses are time-division multiplexed.

10. The apparatus of claim 1 wherein at least one processor of the first plurality of processors also processes data received via its respective dedicated data bus in the second type of processing task.

* * * * *